United States Patent
Nakatani et al.

(10) Patent No.: US 8,711,405 B2
(45) Date of Patent: Apr. 29, 2014

(54) MONITORING DEVICE, MONITORING METHOD AND NON-TRANSITORY COMPUTER READABLE MEDIUM

(75) Inventors: Tooru Nakatani, Kanagawa (JP); Hironori Niwa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 671 days.

(21) Appl. No.: 13/006,517

(22) Filed: Jan. 14, 2011

(65) Prior Publication Data
US 2012/0069388 A1     Mar. 22, 2012

(30) Foreign Application Priority Data
Sep. 21, 2010   (JP) ................................. 2010-211367

(51) Int. Cl.
*G06F 3/12*     (2006.01)
*G06F 3/00*     (2006.01)

(52) U.S. Cl.
USPC .......................................... 358/1.15; 710/19

(58) Field of Classification Search
USPC .......................................... 710/19; 358/1.15
See application file for complete search history.

(56) References Cited

U.S. PATENT DOCUMENTS

| | | | |
|---|---|---|---|
| 6,912,366 B1* | 6/2005 | Yamamoto et al. | 399/27 |
| 2010/0103824 A1* | 4/2010 | Gilmour | 370/245 |
| 2011/0228314 A1* | 9/2011 | Scaff | 358/1.15 |

FOREIGN PATENT DOCUMENTS

| | | | |
|---|---|---|---|
| JP | 2000-293336 A | 10/2000 | |
| JP | 2007-058766 A | 3/2007 | |
| JP | 2007-196642 A | 8/2007 | |

* cited by examiner

*Primary Examiner* — Farley Abad
(74) *Attorney, Agent, or Firm* — Sughrue Mion, PLLC

(57) ABSTRACT

A monitoring device includes an acquiring unit, a first determination unit, a second determination unit and a notification unit. The acquiring unit periodically acquires status information from a printer having a consumable. The first determination unit determines a first state transition from an occurrence state of a consumable alarm to a release state of the consumable alarm and a second state transition from the release state of the consumable alarm to the occurrence state of the consumable alarm, based on the status information. If the first state transition is determined, the second determination unit determines, based on the status information, as to whether the determined first state transition is an apparent first state transition or an actual first state transition. If the actual first state transition is determined and then the second state transition is determined, the notification unit notifies an alarm relating to the consumable.

17 Claims, 10 Drawing Sheets

FIG. 3

| | EXAMPLE OF SETUP VALUES CORRESPONDING TO RESPECTIVE ALARM SENSITIVITIES (HIGHEST, HIGH, MEDIUM, AND LOW) | | | |
|---|---|---|---|---|
| | HIGHEST | HIGH | MEDIUM | LOW |
| SCRUTINY POLLING | DETERMINATION OF APPARENT RELEASE IS NOT MADE | NUMBER OF EXECUTION TIMES = SMALL EXECUTION INTERVAL = SHORT | NUMBER OF EXECUTION TIMES = MEDIUM EXECUTION INTERVAL = MEDIUM | NUMBER OF EXECUTION TIMES = LARGE EXECUTION INTERVAL = LONG |

FIG. 6

| | EXAMPLE OF SETUP VALUES CORRESPONDING TO RESPECTIVE ALARM SENSITIVITIES (HIGHEST, HIGH, MEDIUM, AND LOW) | | | |
|---|---|---|---|---|
| | HIGHEST | HIGH | MEDIUM | LOW |
| TOTAL-NUMBER-OF-PRINT-SHEETS COMPARISON | DETERMINATION OF APPARENT RELEASE IS NOT MADE | THRESHOLD VALUE FOR DIFFERENCE BETWEEN NUMBERS OF SHEETS = SMALL | THRESHOLD VALUE FOR DIFFERENCE BETWEEN NUMBERS OF SHEETS = MEDIUM | THRESHOLD VALUE FOR DIFFERENCE BETWEEN NUMBERS OF SHEETS = LARGE |

FIG. 10

| | EXAMPLE OF SETUP VALUES CORRESPONDING TO RESPECTIVE ALARM SENSITIVITIES (HIGHEST, HIGH, MEDIUM, AND LOW) | | | |
|---|---|---|---|---|
| | HIGHEST | HIGH | MEDIUM | LOW |
| SCRUTINY POLLING | DETERMINATION OF APPARENT RELEASE IS NOT MADE | NUMBER OF EXECUTION TIMES = SMALL EXECUTION INTERVAL = SHORT | NUMBER OF EXECUTION TIMES = MEDIUM EXECUTION INTERVAL = MEDIUM | NUMBER OF EXECUTION TIMES = LARGE EXECUTION INTERVAL = LONG |
| TOTAL-NUMBER-OF-PRINT-SHEETS COMPARISON | DETERMINATION OF APPARENT RELEASE IS NOT MADE | THRESHOLD VALUE FOR DIFFERENCE BETWEEN NUMBERS OF SHEETS = SMALL | THRESHOLD VALUE FOR DIFFERENCE BETWEEN NUMBERS OF SHEETS = MEDIUM | THRESHOLD VALUE FOR DIFFERENCE BETWEEN NUMBERS OF SHEETS = LARGE |
| REMAINING AMOUNT COMPARISON | DETERMINATION OF APPARENT RELEASE IS NOT MADE | THRESHOLD VALUE FOR DIFFERENCE BETWEEN REMAINING AMOUNTS = SMALL | THRESHOLD VALUE FOR DIFFERENCE BETWEEN REMAINING AMOUNTS = MEDIUM | THRESHOLD VALUE FOR DIFFERENCE BETWEEN REMAINING AMOUNTS = LARGE |
| COMPREHENSIVE DETERMINATION METHOD | DETERMINATION OF APPARENT RELEASE IS NOT MADE | IF ANY ONE IS RELEASE, RELEASE. | IF TWO OR MORE ARE RELEASE, RELEASE. | IF ALL ARE RELEASE, RELEASE. |

MONITORING DEVICE, MONITORING METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2010-211367 filed Sep. 21, 2010.

BACKGROUND

1. Technical Field

One exemplary embodiment of the invention relates to a monitoring device, a monitoring method and a non-transitory computer readable medium.

2. Related Art

Monitoring software for monitoring printers has been installed in a computer on a network of a LAN (local area network), etc., in an office and has been used as a monitoring device. The monitoring device makes an inquiry to (polls) printers which are monitored devices, for example, periodically and acquires various information indicating status information of the printers from the printers. If the acquired information contains an alarm (primary alert) relating to consumables, such as toner and a photoconductive drum, provided in the printer, the monitoring device notifies an administrator of an alarm (secondary alert) by displaying a pop-up screen, transmitting an email, etc., to prompt the administrator to replace the consumables, etc.

The monitoring device of this kind stores the primary alert related to the consumables detected by the polling, and if the monitoring device detects the same primary alert during a polling operation after once issuing the alarm (secondary alert) to the administrator in response to detection of the primary alert, the monitoring device suppresses from sending the alarm to the administrator again.

SUMMARY

A monitoring device includes an acquiring unit, a first determination unit, a second determination unit and a notification unit. The acquiring unit periodically acquires status information from a printer having a consumable. The first determination unit determines a first state transition from an occurrence state of a consumable alarm to a release state of the consumable alarm and a second state transition from the release state of the consumable alarm to the occurrence state of the consumable alarm, based on the status information periodically acquired by the acquiring unit. If the first state transition is determined, the second determination unit determines, based on the status information periodically acquired by the acquiring unit, as to whether the determined first state transition is an apparent first state transition or an actual first state transition. If the actual first state transition is determined and then the second state transition is determined, the notification unit notifies an alarm relating to the consumable to an administrator.

BRIEF DESCRIPTION OF THE DRAWINGS

Exemplary embodiments of the invention will be described in detail based on the accompanying drawings, wherein

FIG. 3 is a drawing showing an example of setup values for scrutiny polling for each alarm sensitivity in the first example shown in FIG. 1;

FIG. 6 is a drawing showing an example of settings of a threshold value for a difference in total number of print sheets for each alarm sensitivity in the second example;

FIG. 10 is a drawing showing an example of various settings for each alarm sensitivity in the fourth example shown in FIG. 9.

DETAILED DESCRIPTION

Exemplary embodiments of the invention will be described with reference to the accompanying drawings.

Figure 1:
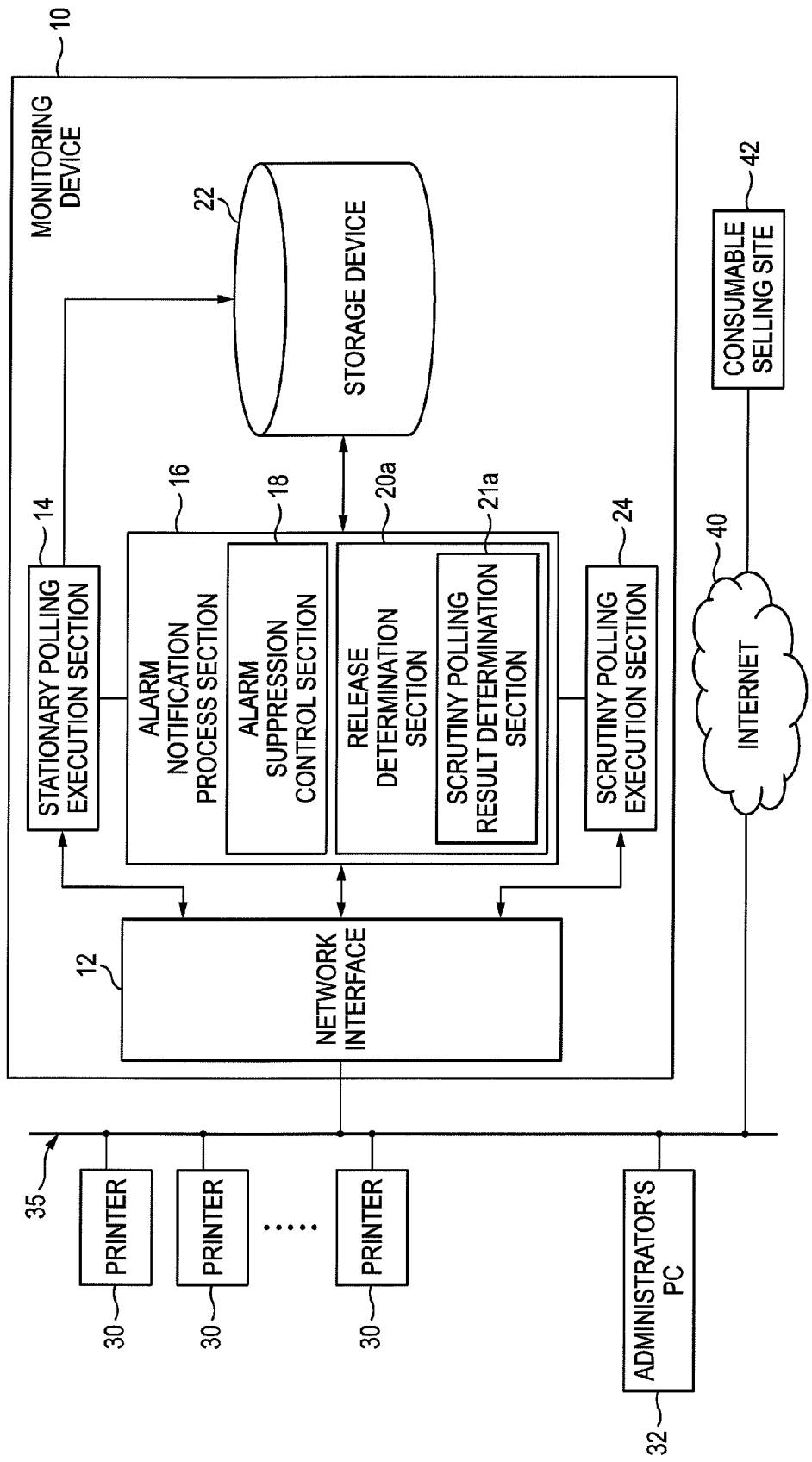
FIG. 1 is a drawing showing a first example of a monitoring device according to an exemplary embodiment of the invention.

In an example of a system shown in FIG. 1, a monitoring device 10 according to an exemplary embodiment, plural printers (monitored devices) 30, and an administrator PC (personal computer) 32 are connected to a network 35 such as a local area network. The network 35 is connected to the Internet 40. For example, the administrator PC 32 can access a consumable selling site 42 on the Internet 40. The monitoring device 10 and one or more printers 30 make up a print system having a monitoring function. The monitoring device 10 and the consumable selling site 42 make up a consumable ordering and distributing system. The system shown in FIG. 1 is a total system that can perform electronic cooperation from execution of print to distribution of consumables as the whole system.

Each of the printers 30 is a device having a print function, such as a network printer, a facsimile, a digital copier, a digital multiple function device (multiple function device having functions of a printer, a scanner, a facsimile, etc.,). Replaceable consumable components (hereinafter referred to as "consumables") such as a toner cartridge and a photoconductive drum are attached to each printer 30. Each printer 30 has a function of responding to periodical polling from the monitoring device 10. Each printer 30 has plural sensors, an alarm determination section, a management table, etc., although not shown in the figure. The sensors detect a status of each component to be detected. The alarm determination section determines, for each component which is an alarm determination target, as to whether or not to generate an alarm (primary alert as a local alert) based on the sensor detection result. Status information relating to the printer 30 is recorded in the management table (database) serving as a storage section in which the sensor detection result, the determination result of the alarm determination section, and the like are recorded. The management table contains a large number of records and is a table to be referenced by the monitoring device 10. Specifically, for example, a remaining amount sensor detects a remaining amount of each attached consumable. The alarm determination section determines as to whether or not a detection value of the sensor reaches an alarm level such as a level at which the remaining amount of the consumable becomes small to such an extent that the consumable is to be replaced by a new one ("slight remaining amount") or a level at which the remaining amount of the consumable becomes zero ("no remaining amount"), and records the determination result in the management table. Upon reception of polling from the monitoring device 10, the printer 30 executes a process of responding to the monitoring device 10 with the values of all or some records making up the management table (record data). The plural printers 30 may be different models or may be products of different manufacturers.

The monitoring device 10 is a device for monitoring the status of each printer 30. In the exemplary embodiment, particularly, the monitoring device 10 monitors the status of each consumable that each printer 30 has. In the monitoring device 10, a network interface 12 is a device for conducting data communications with any other device (for example, the printer 30) through the network 35. Function modules, such as a stationary polling execution section 14 and an alarm notification process section 16, communicate with devices on the network 35 through the network interface 12. The functions of the monitoring device 10 may be implemented by a combination of software and hardware (e.g., a CPU, a processor or a microcomputer).

In the exemplary embodiment, two polling execution sections, that is, the stationary polling execution section 14 and a scrutiny polling section 24 are provided as polling execution sections. Of course, they may be implemented as a single software product. First, the former will be described. The stationary polling execution section 14 is a function module for periodically polling each printer 30 to stationarily monitor each printer 30 which is the monitored device, particularly to monitor the status of each consumable. In the stationary polling, for example, for each consumable of the printer 30 (toner cartridge, photoconductive drum cartridge, etc.), information indicating presence or absence of an alarm relating to the remaining amount (information indicating an alarm occurrence state or an alarm release state) is collected. Of course, generally, a large amount of other information may be collected by the polling. When information indicating the alarm occurrence state is collected in the stationary polling, the monitoring device 10 internally generates a primary alert. The stationary polling is performed at predetermined polling execution time intervals (period). The administrator of the monitoring device 10 may be allowed to select the polling execution interval for the stationary polling, in the range of several minutes to several days, for example. The stationary polling basically is similar to that performed by a monitoring device of a related art. Log information indicating a result of each stationary polling executed by the stationary polling execution section 14 is stored in a storage device 22 of the monitoring device 10. The log information stored in the storage device 22 contains, for example, polling execution date and time, identification information of the polled printer 30, and information of the polling result. The information of the polling result is information obtained from a response from the polled printer 30. The polling result contains, for each consumable of the polled printer 30, for example, identification information of the consumable, information of the status of the consumable, etc. The information of the status of each consumable contains, for example, information of a level of a remaining amount of the consumable, etc. Examples of the level of the remaining amount include alarm levels such as "slight remaining amount," and "no remaining amount". That is, if it is determined from the information provided by the stationary polling to generate a primary alert, information of the primary alert is recorded in the 9 log.

In the exemplary embodiment, the alarm notification process section 16 serves as a first determination unit, a second determination unit, and a notification unit. The first determination unit determines state transition from the alarm occurrence state to the alarm release state (release state transition as first state transition) and determines state transition from the alarm release state to the alarm occurrence state (occurrence state transition as second state transition). The determinations regarding both of the release state transition and the occurrence state transition are realized as the function of the alarm notification process section 16. In FIG. 1, a module for making the latter determination is represented as an alarm suppression control section 18. The second determination unit discriminates between a apparent release state and an actual release state and maintains the alarm occurrence state even if the apparent release state exists (namely, the second determination unit prevents that it is determined the occurrence state transition occurs and a duplicate alarm is reported to the administrator). A module for performing such a process is represented as a release determination section 20a. If the second determination unit determines the actual release state (release state transition) and then the first determination unit determines the occurrence state transition, that is, if two step determinations are cleared, the notification unit reports an alarm (secondary alert) relating to the consumable(s) to the administrator. The respective units will be described more specifically based on the configuration of the exemplary embodiment.

At first, general matters about the alarm notification process section 16 will be described. If there is a consumable whose remaining amount reaches a warning level in the polling result of the stationary polling execution section 14, that is, there is a consumable causing an alarm (primary alert) to occur, the alarm notification process section 16 performs an alarm notification process of reporting an alarm (secondary alert) about the consumable to the administrator. In the alarm notification process, identification information of the printer 30 which the alarm relates to, identification information of the consumable, and information of the warning level are reported. Information about detection date and time of the alarm may be included. To report the alarm to the administrator, specifically, for example, a dialog screen for reporting the alarm is provided as pop-up display to the administrator PC 32 logging in the monitoring device 10 or email is transmitted to the administrator. The alarm report (alarm notification) may contain a link to a selling web page of the alarmed consumable on the consumable selling site 42. The administrator browses the alarm report (alarm notification) on the administrator PC 32. If the administrator determines that supply of the consumable is required, the administrator accesses the consumable selling site 42 and performs a purchase procedure of the consumable. The consumable selling site 42 performs a process of automatically distributing the ordered consumable, etc.

The PC of the administrator may be used as the monitoring device 10, in which case pop-up display for alarm report is produced on the screen of the monitoring device 10. A system configuration in which the monitoring device 10 is built in a specific printer 30 is also possible.

Further, in the exemplary embodiment, the alarm notification process section 16 includes the alarm suppression control section 18 and the release determination section 20a as shown in FIG. 1.

In the process in which a primary alert is detected periodically, the alarm suppression control section 18 performs control to suppress repetitive reporting of the same alarm (secondary alert) to the administrator each time the primary alert is detected. That is, when an alarm (primary alert) indicating that the remaining amount of one consumable reaches one alarm level is obtained as a response from one printer by stationary polling, the alarm suppression control section 18 references the log stored in the storage device 22. If the same alarm (primary alert) is detected for the same consumable in the previous polling for the printer (and if a secondary alert about the alarm is reported to the administrator), the alarm suppression control section 18 suppresses the notification process so as not to report to the administrator an alarm (secondary alert) regarding the alarm (primary alert) contained in the current polling result. As a result, it is recognized that the alarm suppression control section 18 determines, for each monitor target, state transition from the alarm release state to the alarm occurrence state and ignores others. With this alarm suppression control section 18, when a new alarm occurrence state occurs, one alarm (secondary alert) is reported to the administrator and thus administrator's duplicate consumable ordering and the like can be effectively avoided.

In each printer 30, if a flag indicating as to whether or not the alarm occurrence state occurs (if the alarm occurrence state occurs, a flag indicating an alarm level) for each consumable of each printer is recorded in the management table, the above-described determination is made with reference to the respective flags. The flag can represent stages number of which is equal to the number of alarm levels+1. The alarm determination section for managing the management table sets a value indicating the alarm release state in the initial state as the value of the flag. When an alarm level is detected, the alarm determination section sets a value indicating the alarm level. If it is determined that the alarm is released, the alarm determination section resets (changes) the value of the flag to the value indicating the alarm release state.

By the way, when alarm suppression is performed by the alarm suppress control only, if continuous repetitive determinations of the same alarm (primary alert) in the stationary polling are once stopped, the alarm suppression control is immediately released. That is, if a specific alarm (primary alert) continuously repeatedly determined so far is not determined in one stationary polling, the alarm suppression control is released uniformly. Therefore, if occurrence of the same alarm (primary alert) is determined in the later stationary polling, an alarm (secondary alert) is again reported to the administrator. The alarm suppression control reports an alarm to the administrator in response to state transition from the alarm release state to the alarm occurrence state and does not ascertain the nature of the release.

However, depending on a model or a situation of the printer 30, although the alarm occurrence state actually continues, the alarm (primary alert) may be released apparently.

For example, some printers can make a response indicating occurrence of the alarm occurrence state to polling even in a power saving mode. However, when polling is executed within a short time period until completion of a process of resuming from the power saving mode, some printers do not make a response indicating occurrence of the alarm occurrence state even though the alarm occurrence state actually continues. Therefore, if the timing of polling accidentally coincides with such a time period, the monitoring device may determine the alarm release state although the alarm occurrence state actually continues.

With regard to the alarm occurrence state relating to the remaining amount of a consumable, some printers do not make a response indicating occurrence of the alarm occurrence state to polling from the monitoring device even if the alarm occurrence state actually occurs in a given time period from power on. Therefore, if the timing of polling accidentally coincides with such a time period, the alarm (primary alert) seems to be released from the monitoring device although actually the alarm occurrence state is not released.

In some printers, when the remaining amount of toner decreases and an alarm occurs, if a user removes the toner cartridge and then shakes it and again attaches the toner cartridge, an alarm is not issued temporarily.

As described above, a situation in which it seems that the alarm occurrence state relating to a consumable of the printer is temporarily released when viewed from the monitoring device occurs because of various reasons. If such apparent release occurs, later the state is returned to the same alarm occurrence state and thus it is erroneously recognized in the monitoring device that a new alarm occurrence state occurs in a later polling and consequently an alarm is again issued to the administrator. In this case, for example, it becomes difficult for the administrator to distinguish between (i) occurrence of the same alarm after the previous alarm is actually resolved and (ii) continuation of the previous alarm.

Then, in the exemplary embodiment, the release determination section 20a determines as to whether release of an alarm detected by the stationary polling is an apparent release state or an actual release state. Specifically, if it is determined that the release is the apparent release state, suppression of alarm notification is not released, that is, is maintained.

Some techniques can be named as a determination method as to whether or not the release is apparent alarm release. For example, as described below with reference to FIG. 1, a method additionally executes scrutiny polling aside from the stationary polling to scrutinize based on post information. Also, as described later, another method additionally references and scrutinizes information other than information indicating presence or absence of an alarm in question (particularly, information indicating an actual operation amount). Further, a method provided by combining them may be performed. In any way, if a determination is made considering information which has not yet been referenced up to now, the determination accuracy as to whether or not the alarm release state occurs can be enhanced.

In an example in FIG. 1, the release determination section 20a determines as to whether or not release of alarm detected by stationary polling is apparent release, using scrutiny polling executed by the scrutiny polling section 24. The scrutiny polling section 24 performs scrutiny polling at polling execution interval (period) shorter than the stationary polling. Specifically, although an alarm is detected in the stationary polling so far for one consumable of one printer 30, if no alarm is detected in the present stationary polling (that is, the alarm is released), scrutiny polling at shorter time intervals is executed to check as to whether or not the release is actual release or apparent release. Therefore, the scrutiny polling basically may be executed only for the printer 30 where release of the alarm is detected by the stationary polling, and the scrutiny polling may only poll (inquire) the status of the consumable for which the alarm has been issued. However, any other information may be obtained as required.

The scrutiny polling is started with detection of release of alarm by the stationary polling executed by the stationary polling execution section 14 as a trigger and is repeated as many times as the predetermined number of execution times. For example, a scrutiny polling sequence is complete before the timing of the next stationary polling. Thus, the execution interval of the scrutiny polling may be determined by a method of dividing the execution interval of the stationary polling by (number of execution times+k (k is a natural number)), for example, (of course, the method is not limited thereto). The execution interval of the scrutiny polling is defined based on the execution interval of the stationary polling, so that if the setup value of the execution interval of the stationary polling is changed, the execution interval of the scrutiny polling automatically follows the change.

The release determination section 20a includes a scrutiny polling result determination section 21a for determining as to whether detected release of primary alert is apparent release or actual release, based on the result of the scrutiny polling. When the alarm which the scrutiny polling executed by the scrutiny polling section 24 relates to is again detected, the scrutiny polling result determination section 21a determines that the previous alarm release is apparent release, and commands the alarm suppression control section 18 to continue notification suppression of the secondary alert about the alarm. That is, even if state transition from the alarm occurrence state to the alarm release state is actually detected, it is ignored, and it is assumed that the alarm occurrence state still continues. Therefore, it is disabled to again detect the alarm occurrence state in fact.

Figure 2:
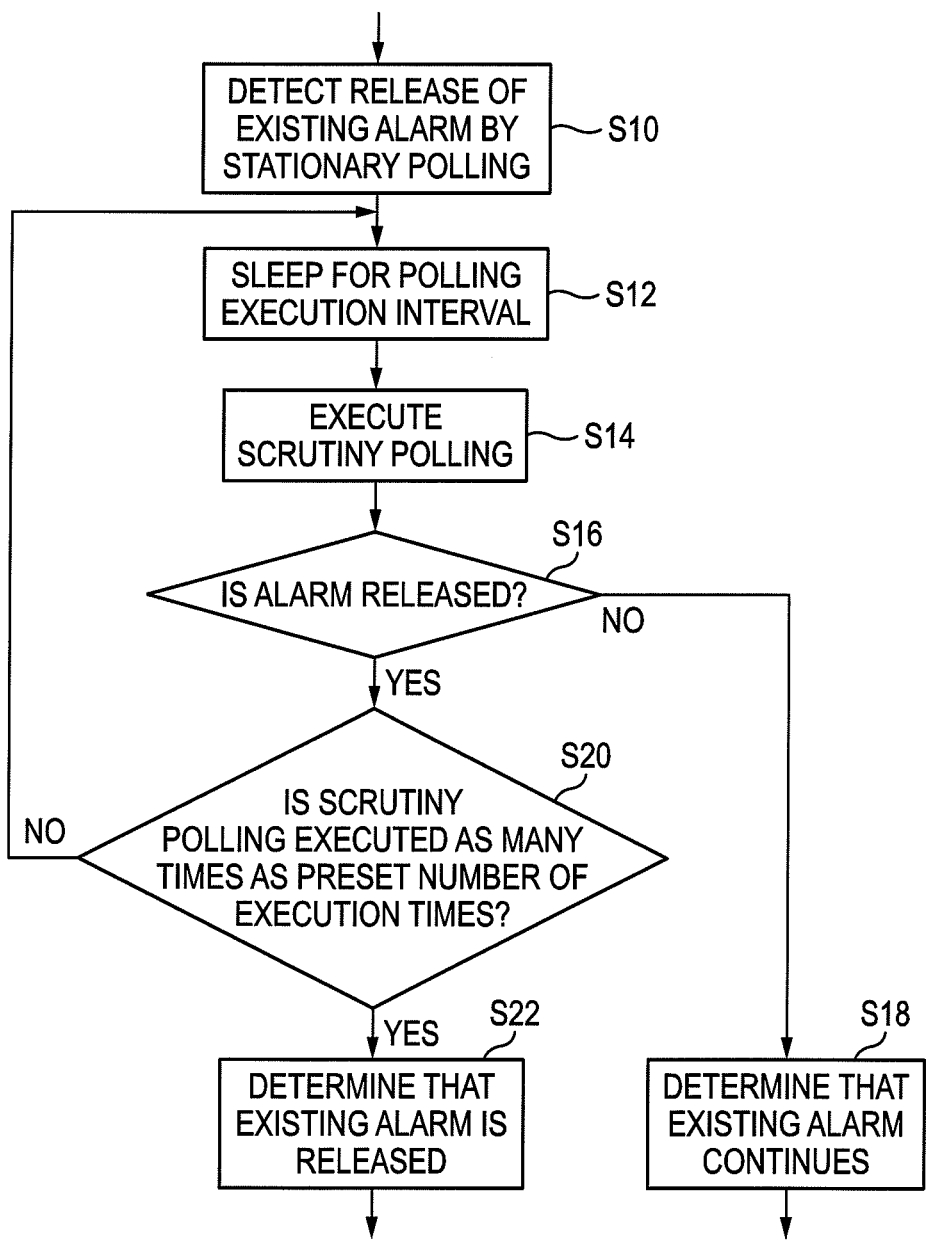
FIG. 2 is a flowchart showing an example of a process procedure of a release determination section of the first example shown in FIG. 1.

FIG. 2 shows an example of a process procedure of the release determination section 20a. In the procedure, when detecting release of existing alarm (primary alert) by the stationary polling (S10: first determination), the release determination section 20a commands the scrutiny polling section 24 to execute the scrutiny polling. Upon reception of the command, the scrutiny polling section 24 sleeps for the polling execution interval of the scrutiny polling (S12) and then performs the scrutiny polling of the status of the consumable which the alarm relates to, for the printer 30 which the existing alarm whose release is detected relates to (S14).

The printer 30 responds to the scrutiny polling. If the alarm release is apparent release and if a cause of the apparent release is eliminated at a point in time of the scrutiny polling (for example, restoration from the power saving mode is complete, etc.,), the printer 30 sends back information indicating the alarm occurrence state in response to the scrutiny polling. Conversely, if the cause of the apparent release is not eliminated or if the alarm release is actual release rather than the apparent release, the printer 30 sends back information indicating the alarm release state.

The scrutiny polling result determination section 21a of the release determination section 20a determines which of the alarm occurrence state and the alarm release state the response from the printer 30 indicates (S16: second determination). If the response indicates the alarm occurrence state (the determination result at S16 is NO), the scrutiny polling result determination section 21a executes determination (and necessary processing) to continue the existing alarm whose release is detected by the stationary polling (S18). In this case, the polling result indicating that the alarm is released in the present stationary polling in the log information may be corrected so as to indicate that the alarm is not released. Instead, a message indicating that the alarm is released as the result of the stationary polling may be recorded, and information indicating that the release is apparent release may be recorded as information for the next alarm suppression determination. Likewise, to use a flag for determination of alarm suppression, while a message indicating that the alarm is released as the result of the stationary polling is recorded, the flag may be prevented from being reset to the value of the alarm release state.

If the result of the scrutiny polling indicates the alarm release state (the determination result at S16 is YES), the scrutiny polling result determination section 21a determines as to whether or not the scrutiny polling has been executed as many times as the preset number of execution times (S20). If the scrutiny polling has not been executed as many times as the preset number of execution times, the process returns to S12 and the scrutiny polling is again performed. If the alarm is detected even only once until the scrutiny polling is executed as many times as the preset number of execution times, it is determined that the alarm occurrence state continues (S18), and release of notification suppression relating to the alarm is canceled. On the other hand, if the alarm is not detected at all until the scrutiny polling is executed as many times as the preset number of execution times, the release determination section 20a determines that the alarm is actually released (S22). In the case where the flag for determination of alarm suppression is used, the flag is reset to the value of the alarm release state.

The administrator of the monitoring device 10 may be allowed to set the number of execution times of the scrutiny polling and the polling execution interval of the scrutiny polling. This setting may be made by a method of specifically setting a numeric value; to facilitate the setting operation, the setting may be specified by a level. FIG. 3 shows an example of switching the number of execution times of the scrutiny polling and the polling execution interval of the scrutiny polling in accordance with an alarm sensitivity.

The alarm sensitivity is a value indicating a degree at which an alarm (primary alert) detected by stationary polling leads to alarm notification (secondary alert) sent to the administrator. As the alarm sensitivity is higher, the secondary alert is more easily issued to the administrator. In the exemplary embodiment, the alarm sensitivity is associated with "determination easiness" indicating how easily release of an alarm (primary alert) is determined to be "actual release."

For example, after release of an alarm (primary alert) is detected, when the same primary alert is detected, if it is determined that the release of the primary alert is apparent release, even if the same primary alert is later detected, a secondary alert is not issued to the administrator. In contrast, when it is determined that the release is actual release, if the same primary alert is later detected, a secondary alert is issued to the administrator. Thus, whether or not the secondary alert is issued to the administrator is determined depending on whether release of the same alert is determined to be actual release or apparent release. That is, if a condition under which it is easily determined that release of a primary alert is "actual release" is adopted, the possibility that an alarm (secondary alert) is issued to the administrator in response to detection of a primary alert, that is, the alarm sensitivity becomes relatively high as compared with the case where a different condition is adopted.

The reason why the expression "alarm sensitivity" is employed is that intuitive understandability from the viewpoint of the administrator (human being) is considered. The alarm seen from the administrator is the secondary alert, and the expression high "sensitivity" about the alarm is used to mean that an alarm is easily issued.

On the other hand, in the monitoring device 10, the alarm sensitivity is associated with a degree (looseness) of a condition at which release of a primary alert is determined to be "actual release." That is, a condition under which it is more easily determined that release of a primary alert is "actual release" as the higher alarm sensitivity is adopted. FIG. 3 shows an example of the association between the alarm sensitivity and the condition.

In the example in FIG. 3, the alarm sensitivity is separated into four levels of highest, high, medium, and low. At the "highest" alarm sensitivity, the result of stationary polling is accepted as it is; if release of an alarm (primary alert) is detected, a determination based on scrutiny polling is not made, and it is automatically assumed that the release is actual release. Therefore, if the same primary alert is detected in the later stationary polling, a secondary alert is reported to the administrator. That is, at the "highest" alarm sensitivity, release of every primary alert is automatically assumed to be actual release. Therefore, a secondary alert, which would not be issued at lower alarm sensitivities because the release is assumed to be apparent release, is also issued. Accordingly, the frequency of alarms increases. At "high," "medium," and "low" levels of the alarm sensitivity, a determination based on the scrutiny polling is made, but the number of execution times of the scrutiny polling and the polling execution interval of the scrutiny polling vary from one level to another. As the whole tendency, as the alarm sensitivity is higher, the number of execution times lessens and the polling execution interval is shorter. In the procedure in FIG. 2, if release of a primary alert (that is, alarm release state) is not detected in all the scrutiny polling which is executed as many times as the predetermined number of execution times, the release is not assumed to be actual release. Thus, it can be said that as the number of execution times is smaller, it is more easily determined that the release is actual release. As the polling execution interval is shorter, the repetitive time period of scrutiny polling is shorter, and the possibility that re-occurrence of primary alert whose release is once detected may be detected in such a short time period is relatively low. Thus, it can be said that it is hardly determined that the release is apparent release (conversely, the release is easily determined to be actual release). Conversely, as the alarm sensitivity is lower, the number of execution times of scrutiny polling is larger, the repetitive time period of scrutiny polling is longer, and a prudent determination is made. As the number of execution times increases and the time period of scrutiny polling prolongs, it can be said that it is more hardly determined that the release is actual release.

In FIG. 3, the number of execution times is abstractly shown as "small," "medium," and "large", and the polling execution interval is abstractly shown as "short," "medium," and "long." However, in actual setup information, a specific value of the number of execution times and a specific value of the polling execution interval are set for each level. The administrator selects any desired one of the four levels through a graphical user interface, for example.

In the example shown in FIG. 3, both the number of execution times and the polling execution interval are changed in accordance with the alarm sensitivity. However, only either of them may be changed.

Next, another example will be described with reference to FIGS. 4 to 6. Elements having similar functions to those shown in FIG. 1 will be denoted by the same reference numerals in FIG. 4 and will not be described again.

Figure 4:
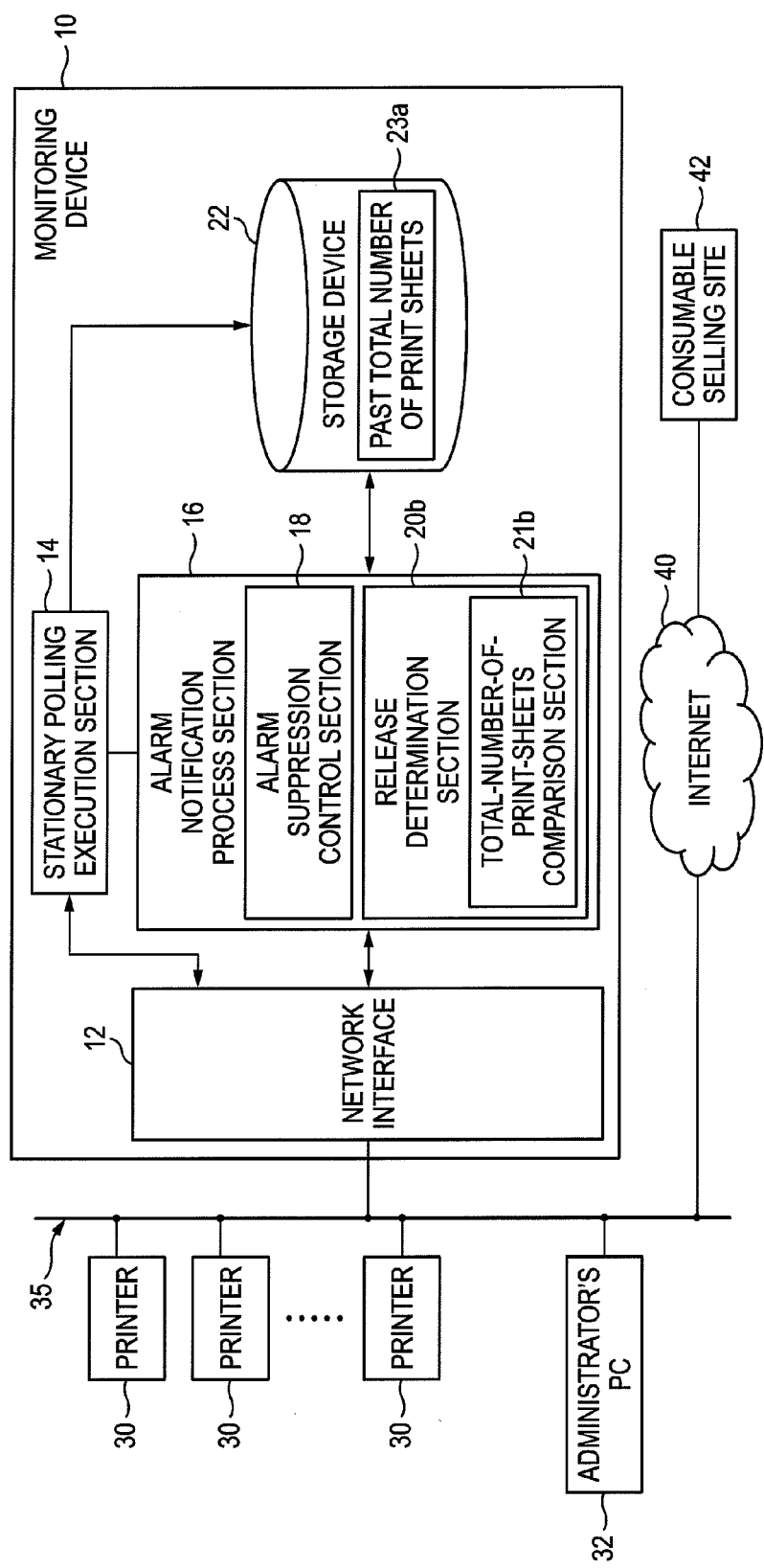
FIG. 4 is a drawing showing a second example of a monitoring device according to the exemplary embodiment of the invention.

The example in FIG. 4 is different from the example in FIG. 1 in a determination process executed by a release determination section 20b. That is, the release determination section 20a in FIG. 1 determines, by scrutiny polling of the scrutiny polling section 24, as to whether or not release of an alarm (primary alert) detected by stationary polling is apparent release. In contrast, in the example in FIG. 4, the determination is made based on evaluation, executed by a total-number-of-print-sheets comparison section 21b, of a change in the total number of print sheets.

That is, in the example in FIG. 4, the stationary polling execution section 14 acquires information about the total number of print sheets of a polled printer 30 in stationary polling and stores the information in the storage device 22, for example, as a part of log information (past total number of print sheets 23a). The past total number of print sheets 23a contains, for each printer, information about the total numbers of print sheets which were acquired in the past stationary polling. The printer 30 generally includes a counter for totaling the number of print sheets after shipment, and the value of the counter may be collected in stationary polling as the total number of print sheets.

If release of an alarm about one consumable of one printer 30 is detected by stationary polling at one time, the total-number-of-print-sheets comparison section 21b makes a comparison between the total number of print sheets obtained in the present stationary polling and the total number of print sheets of the printer 30 which was obtained at the previous stationary polling and which is stored in the storage device 22. If a difference between the both numbers is less than a predetermined threshold value, it is determined that release of the alarm (primary alert) is apparent release, and alarm notification suppression is continued. The fact that the difference between the previous and present total numbers of print sheets is less than the threshold value means that the printer 30 does not much operate (print) between the previous stationary polling and the present stationary polling. That is, it can be said that a change in the total number of print sheets is one of index values indicating the actual operation amount of the printer 30. The possibility that the alarm state is actually released while the printer does not much operate from the detection time of the alarm is low. Even if release is detected in stationary polling, the possibility of apparent release, such as at the restoration time from a power saving mode, is high.

Even if a change in the total number of print sheets between the previous stationary polling and the present stationary polling is small, there may be a case where a consumable which the alarm relates to is replaced between the previous time and this time. If the consumable which the alarm relates to is replaced, the alarm release detected in the present stationary polling is actual release rather than apparent release. Therefore, to prevent such a case from being erroneously determined to be apparent release, for example, information as to whether or not each door of the printer 30, which is opened and closed in replacement of each consumable, is opened and closed may also be collected in stationary polling. When it is seen that the door corresponding to the consumable which the alarm relates to is opened and closed from the information collected in the present stationary polling, even if the difference between the present total number of print sheets and the previous total number of print sheets is less than the threshold value, it is determined that release of the alarm is actual release rather than apparent release.

However, even though the actual release is erroneously determined to be apparent release, if the printer 30 operates as usual later, a change in the total number of print sheets becomes equal to or larger than the threshold value in the later stationary polling, and release of the alarm is detected. Thus, the erroneous determination would be solved naturally comparatively early. Therefore, the measure against the erroneous determination described above is not necessarily required.

Figure 5:
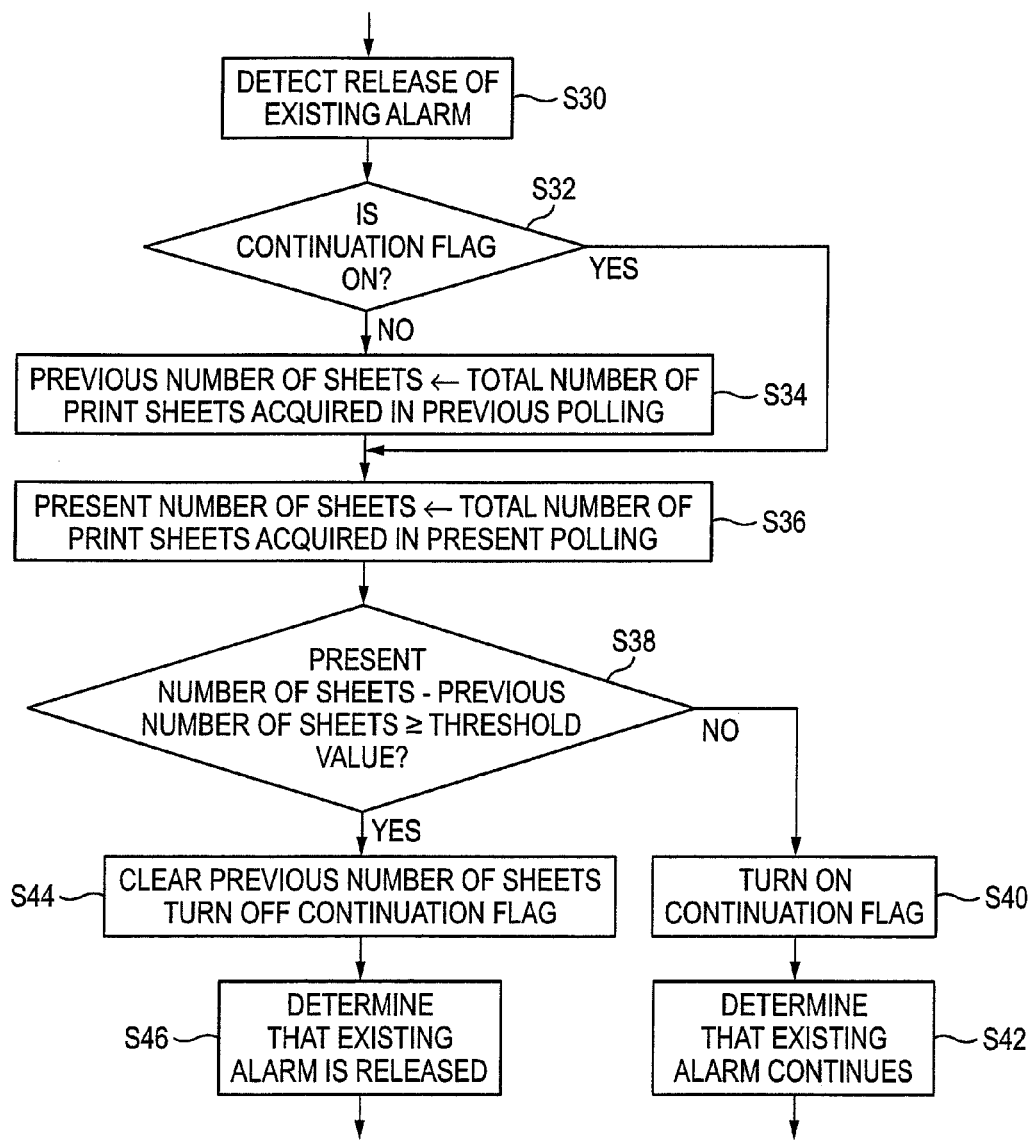
FIG. 5 is a flowchart showing an example of a process procedure of a release determination section of the second example shown in FIG. 4.

FIG. 5 shows an example of a process procedure executed by the release determination section 20b in FIG. 4. In the procedure, when detecting release of an existing alarm (primary alert) by stationary polling (S30), the release determination section 20b determines as to whether or not a continuation flag is on (S32). The continuation flag is a flag provided for each alarm, that is, for each consumable of each printer 30 (if there are plural alarm levels of the consumable, for each level). The initial value is "off." After the alarm (primary alert) is detected and the alarm notification process section 16 reports a secondary alert to the administrator, when release of the primary alert is first detected by stationary polling, the flag is turned "on." When the release determination section 20b determines that the alarm is actually released, the flag is turned "off." That is, at S32, it is determined as to whether or not "release of existing alarm" detected at S30 is first detection of primary alert after the existing alarm (primary alert) is first detected and the alarm notification process section 16 reports secondary alert. If it is determined at S32 that the continuation flag is off, release of the alarm in question is first detected, and thus the total number of print sheets acquired in the previous stationary polling is read from the storage device 22 and is assigned to a control variable "previously number of sheets" (S34). If it is determined at S32 that the continuation flag is on, S34 is skipped.

The total number of print sheets acquired in the present stationary polling is assigned to a variable "present number of sheets" (S36), and the total-number-of-print-sheets comparison section 21b determines as to whether or not the result of subtracting the previous number of sheets from the present number of sheets is equal to or larger than a predetermined threshold value (S38).

If the determination result is No, that is, the subtracting result is less than the threshold value, the release determination section 20b turns on the continuation flag (or holds the continuation flag on) (S40) and determines that the existing alarm whose release is detected by the stationary polling at S30 is continuing (that is, is not actually released) (S42). In this case, log information or a flag for determination of alarm suppression is handled as in the examples in FIGS. 1 and 2. Thus, if it is determined that the existing alarm is continuing and then release of the alarm is again detected at S30, since the continuation flag is on, S34 is skipped. That is, the value of the control variable "previous number of sheets" is kept to be the total number of print sheets which is acquired in the stationary polling just before release of the existing alarm is first detected. In the determination at S38, the difference between the "previous number of sheets" and the total number of print sheets acquired in the present polling is obtained. Thus, in the example in FIG. 5, the "previous number of sheets" on which the difference is based is fixed, and the difference between the previous total number of print sheets and the present total number of print sheets is evaluated. In a method of always evaluating the difference between the previous total number of print sheets and the present total number of print sheets, if the total number of print sheets gradually increases, there is a possibility that it will not be determined that the alarm is actually released. However, such a defective condition does not occur if the "previous number of sheets" is thus fixed.

If it is determined at S38 that the result of subtracting the previous number of sheets from the present number of sheets is equal to or larger than the threshold value, the release determination section 20b clears the control variable "previous number of sheets" and turns off the continuation flag (S44) and determines that the alarm is actually released (S46). In the case where a flag for determination of alarm suppression is used, the flag is reset to the value of the alarm release state. Accordingly, suppression of alarm notification process about the alarm is released.

The administrator of the monitoring device 10 may be allowed to set the threshold value for the difference between the numbers of sheets. The value may be set as a specific numeric value. However, to facilitate the setting operation, the administrator may be allowed to select the threshold value in association with the alarm sensitivity as with the case shown in FIG. 3. FIG. 6 shows an example. In the example in FIG. 6, as with the case shown in FIG. 3, at the "highest" alarm sensitivity, the result of the stationary polling is accepted as it is, and even if alarm release is detected in stationary polling, determination is not made as to whether or not the detected alarm release is apparent release. At each alarm sensitivity level of "high," "medium," and "low," it is determined as to whether or not the detected alarm release is apparent release; the higher the alarm sensitivity is, the smaller the determination threshold value is at S38. As the threshold value is smaller, it is more easily determined that the alarm is actually released, a secondary alert based on re-detection of the same alarm after release more easily occurs, and the frequency of an alarm issued to the administrator increases. In FIG. 6, the determination threshold value of the difference between the numbers of sheets is shown abstractly as "small," "medium," "large," etc. However, in the actual setup information, a specific value of the difference between the numbers of sheets is set as the threshold value for each level. The administrator selects any desired one of the four levels through a graphical user interface, for example.

Next, another example will be described with reference to FIGS. 7 and 8. Elements having similar functions to those shown in FIGS. 1 and 4 are denoted by the same reference numerals in FIG. 7 and will not be described again.

Figure 7:
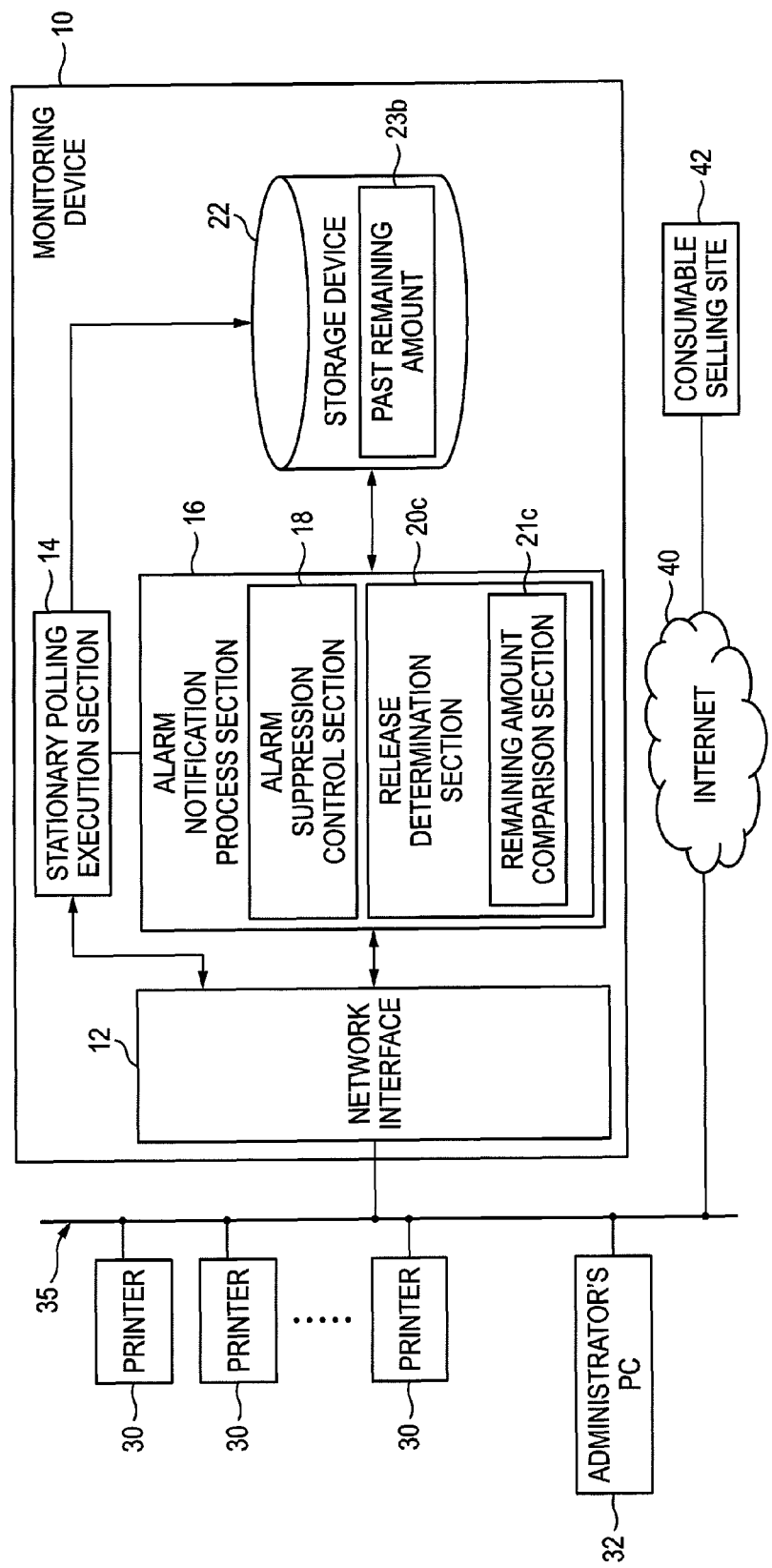
FIG. 7 is a drawing showing a third example of a monitoring device according to the exemplary embodiment of the invention.

The example in FIG. 7 is different from the examples in FIGS. 1 and 4 in a determination process executed by a release determination section 20c. That is, in the example in FIG. 7, a remaining amount comparison section 21c determines as to whether or not release of an alarm (primary alert) detected by stationary polling is apparent release.

That is, in the example in FIG. 7, the stationary polling execution section 14 acquires information about the remaining amount of each consumable of a polled printer 30 in stationary polling and stores the information in the storage device 22, for example, as a part of log information (past remaining amount 23b). The past remaining amount 23b contains information about the remaining amount each time the past stationary polling was executed for each consumable of each printer.

If release of an alarm about one consumable of one printer 30 is detected by stationary polling at one time, the remaining amount comparison section 21c makes a comparison between the remaining amount of the consumable obtained in the present stationary polling and the remaining amount of the consumable at the previous stationary polling time, which is stored in the storage device 22. If the absolute value of the difference between both the amounts is less than a predetermined threshold value, it is determined that release of the alarm (primary alert) is apparent release, and alarm notification suppression is continued. The fact that the absolute value of the difference between the previous and present remaining amounts is less than the threshold value means that the printer 30 does not much operate (print) between the previous stationary polling and the present stationary polling. That is, it can be said that a change in the remaining amount is one of index values indicating the actual operation amount of the printer 30. The possibility that the alarm state is actually released while the printer does not much operate from the detection time of the alarm is low, and even if release is detected in stationary polling, the possibility of apparent release such as the restoration time from a power saving mode is high. Conversely, if the consumable is replaced with a new one until the present stationary polling after the previous stationary polling in which the alarm about the consumable was detected, the absolute value of the difference between the previous and present remaining amounts becomes equal to or more than the threshold value, and thus it is determined that the alarm is actually released.

Figure 8:
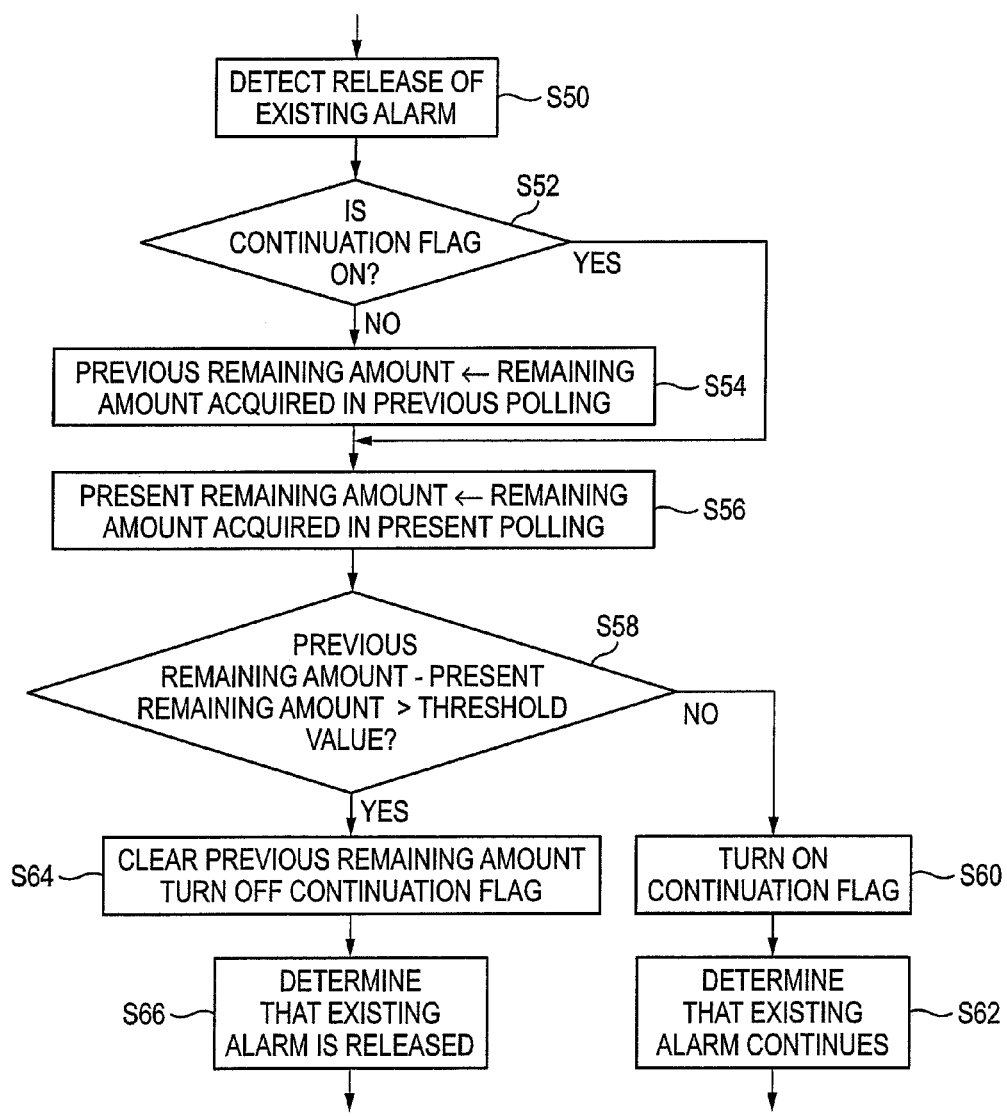
FIG. 8 is a flowchart showing an example of a process procedure of a release determination section of the third example shown in FIG. 7.

FIG. 8 shows an example of a process procedure executed by the release determination section 20c in FIG. 7. In the procedure, when detecting release of an existing alarm by stationary polling (S50), the release determination section 20c determines as to whether or not a continuation flag is on (S52). The continuation flag is a flag similar to the continuation flag used in the procedure in FIG. 5. If it is determined at S52 that the continuation flag is off, release of the alarm is first detected, and thus the remaining amount of the consumable, which the alarm relates to and which is acquired in the previous stationary polling, is read from the storage device 22 and is assigned to a control variable "previous remaining amount" (S54). If it is determined at S52 that the continuation flag is on, S54 is skipped.

The remaining amount of the consumable, which the alarm relates to and which is acquired in the present stationary polling, is assigned to a control variable "present remaining amount" (S56). The remaining amount comparison section 21c determines as to whether or not the absolute value of the difference between the present remaining amount and the previous remaining amount is equal to or larger than a predetermined threshold value (S58).

If the determination result is No, that is, the absolute value of the difference between the present remaining amount and the previous remaining amount is less than the threshold value, the release determination section 20b turns on the continuation flag (or holds the continuation flag on) (S60) and determines that the existing alarm whose release is detected by the stationary polling at S50 is continuing (that is, the existing alarm whose release is detected is not actual release) (S62). In this case, log information or a flag for determination of alarm suppression is handled as in the examples in FIGS. 1 and 2. Thus, if it is determined that the existing alarm is continuing and then release of the alarm is again detected at S50, the continuation flag is on and thus S54 is skipped. That is, the value of the control variable "previous remaining amount" is kept to be the previous remaining amount acquired in the stationary polling just before release of the existing alarm is first detected. In the determination at S58, the difference between the "previous remaining amount" and the "present remaining amount" acquired in the present polling is compared with the threshold value as with the determination at S38 in FIG. 5.

If it is determined at S58 that the absolute value of the difference between the present remaining amount and the previous remaining amount is equal to or larger than the threshold value, the release determination section 20c clears the control variable "previous remaining amount" and turns off the continuation flag (S64) and determines that the alarm is actually released (S66). In the case where a flag for determination of alarm suppression is used, the flag is reset to the value of the alarm release state. Accordingly, suppression of alarm notification process about the alarm is released.

The administrator of the monitoring device 10 may be allowed to set the threshold value about the absolute value of the difference between the remaining amounts, which is used at S58 in the procedure in FIG. 8. The value may be set as a specific numeric value. However, to facilitate the setting operation, the administrator may be allowed to select the threshold value in association with the alarm sensitivity as with the case in FIG. 6. A specific example may be similar to the example in FIG. 6.

Next, still another example will be described with reference to FIGS. 9 and 10. Elements having similar functions to those shown in FIGS. 1, 4, and 7 are denoted by the same reference numerals in FIG. 9 and will not be described again.

Figure 9:
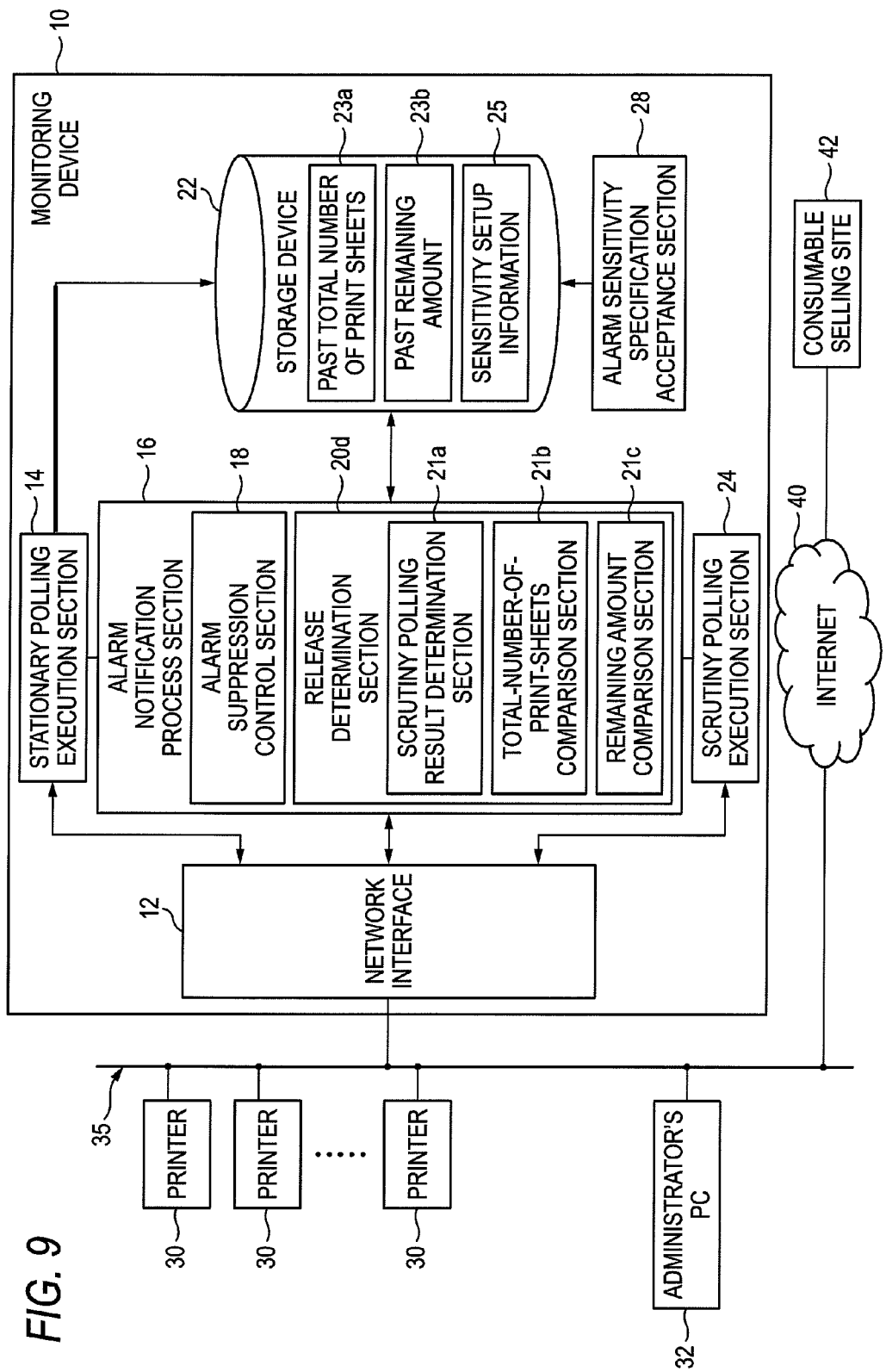
FIG. 9 is a drawing showing a fourth example of a monitoring device according to the exemplary embodiment of the invention.

The example in FIG. 9 is a combination of apparent release determinations in FIGS. 1, 4, and 7. That is, the release determination section 20 in FIG. 9 makes a comprehensive determination using (i) determination based on the result of scrutiny polling executed by the scrutiny polling result determination section 21a, (ii) determination based on a comparison between the total numbers of print sheets executed by the total-number-of-print-sheets comparison section 21b, and (iii) determination based on a comparison between the remaining amounts executed by the remaining amount comparison section 21c. These three determination systems make determinations from different aspects from each other. Thus, by combining the determination results, complementary effect can be expected.

The determination made by the scrutiny polling result determination section 21a, the determination based on the comparison between the total numbers of print sheets executed by the total-number-of-print-sheets comparison section 21b, and the determination based on comparison between the remaining amounts executed by the remaining amount comparison section 21c may be executed as in the examples in FIGS. 1, 4, and 7, respectively. However, a final determination as to whether or not release of an alarm (primary alert) is apparent release is made by comprehensive determination of these individual determination results. That is, in the modified example, whether or not release of alarm suppression control is possible is not determined directly from the determination results of the scrutiny polling result determination section 21a, the total-number-of-print-sheets comparison section 21b, and the remaining amount comparison section 21c; the determination results are comprehensively considered, and whether or not release of alarm suppression control is possible is determined based on the comprehensive determination. In other words, the determination process of each of the scrutiny polling result determination section 21a, the total-number-of-print-sheets comparison section 21b, and the remaining amount comparison section 21c is basic determination on which the comprehensive determination is based.

Several examples of a comprehensive determination method are possible. In a first comprehensive determination method, if it is determined that release of the alarm is not apparent release (namely, is actual release) in at least one of the three basic determinations, it is finally determined that release of the alarm is not apparent release. In other words, it is finally determined that release of the alarm is apparent release only when the release is determined to be apparent release in all of the three basic determinations.

In a second comprehensive determination method, if it is determined that release of the alarm is not apparent release in two or more of the three basic determinations, it is finally determined that release of the alarm is not apparent release. In other words, it is finally determined that release of the alarm is apparent release if the release is determined to be apparent release in one or less of the three basic determinations.

In a third comprehensive determination method, if it is determined that release of the alarm is not apparent release in any of the three basic determinations, it is finally determined that release of the alarm is not apparent release. In other words, it is finally determined that release of the alarm is apparent release if the release is determined to be apparent release in at least one of the three basic determinations.

Which of the first to third comprehensive determination methods is to be adopted may be determined in accordance with the purpose. The first comprehensive determination method most easily determines that the alarm (primary alert) is actually released. The third comprehensive determination method least easily determines that the alarm is actually released.

The three comprehensive determination methods may be assigned to the levels of alarm sensitivity as in the examples in FIGS. 3 and 6, and the administrator may select the alarm sensitivity. Thereby, any of the three methods can be selected. FIG. 10 shows an example. In the example in FIG. 10, for each level of alarm sensitivity, setup values of threshold values, etc., about the three basic determinations are set, and a comprehensive determination method of comprehensively considering the three basic determinations is set. In the example in FIG. 10, at the "highest" alarm sensitivity, the result of stationary polling is accepted as it is, and if alarm release is detected in the stationary polling, it is not determined whether or not the detected alarm release is apparent release as in the cases in FIGS. 3 and 6. At the alarm sensitivity levels "high," "medium," and "low," the setup values in the basic determination methods are similar to those in the examples in FIGS. 3 and 6. When the alarm sensitivity is "high," the first comprehensive determination method is assigned; when the alarm sensitivity is "medium," the second comprehensive determination method is assigned; and the alarm sensitivity is "low," the third comprehensive determination method is assigned.

Information about various setup values corresponding to the alarm sensitivity as illustrated in FIG. 10, that is, sensitivity setup information 25 is stored in the storage device 22 as shown in FIG. 9. An alarm sensitivity specification acceptance section 28 accepts level specification of the alarm sensitivity from the administrator through a graphical interface, for example, like a slider bar. The release determination section 20d reads the information about the setup value corresponding to the accepted alarm sensitivity level from sensitivity setting information 25 and switches parameters of each basic determination and the comprehensive determination method in accordance with the read setup value and then executes a determination process.

In the examples in FIGS. 3, 6, and 10, the alarm sensitivity is separated into four levels, but the number of levels may be smaller or lager than four.

In the example in FIG. 9, the three basic determination methods are combined. However, the combination is not limited thereto. Two of the three basic determination methods may be combined.

In description of the exemplary embodiment and the modified examples, attention is focused on report of a secondary alert to the administrator. However, a report of a primary alert to the administrator is not excluded. For example, systems of processing the exemplary embodiment and the modified examples can also be applied to an example in which while each primary alert determined from the result of stationary polling is displayed on a state display screen provided for the administrator, if a secondary alert is determined, the secondary alert is displayed on a screen conspicuously using a pop-up screen, etc.

The monitoring device 10 illustrated above (except the hardware portion of the network interface 12, etc.,) is realized, for example, by causing a general-purpose computer to execute a program representing processing of each function module described above. The computer has a circuit configuration wherein a microprocessor of a CPU, etc., memory (primary storage) of random access memory (RAM), read-only memory (ROM), etc., an HDD controller for controlling an HDD (hard disk drive), various I/O (input/output) interfaces, a network interface for controlling to connect to a network of a local area network, etc., and the like, for example, as hardware are connected through a bus, for example. A disk drive for reading and/or writing data from and/or to a portable disk record medium of a CD, a DVD, etc., a memory reader-writer for reading and/or writing data from and/or to portable nonvolatile record media of various standards such as flash memory, etc., may be connected to the bus via the I/O interface, for example. The program describing the processing of each function module illustrated above is saved in fixed storage of a hard disk drive, etc., and is installed in a computer via a record medium of a CD, a DVD, etc., or via a communication tool of the network, etc. The program stored in the fixed storage is read into the RAM and is executed by the microprocessor of the CPU, etc., whereby the function module group illustrated above is realized.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

Monitoring device, 12 Network interface, 14 stationary polling execution section, 16 alarm notification process section, 18 alarm suppression control section, 20a, 20b, 20c, 20d Release determination section, 22 Storage section, 24 Scrutiny polling execution section, 30 Printer, 32 Administrator PC, 40 Internet, 42 Consumable selling site

What is claimed is:

1. A monitoring device comprising:
   an acquiring unit that periodically acquires status information from a printer having a consumable;
   a first determination unit that determines
      a first state transition from an occurrence state of a consumable alarm to a release state of the consumable alarm, the release state being a state in which the consumable alarm is cleared, and
      a second state transition from the release state of the consumable alarm to the occurrence state of the consumable alarm
   based on the status information periodically acquired by the acquiring unit;
   a second determination unit, wherein if the first state transition is determined, the second determination unit determines, based on the status information periodically acquired by the acquiring unit, as to whether the determined first state transition is an apparent first state transition or an actual first state transition; and
   a notification unit, wherein if the actual first state transition is determined and then the second state transition is determined, the notification unit notifies an alarm relating to the consumable to an administrator, and
   wherein if the apparent first state transition is determined and then the second state transition is determined, the notification unit suppresses the alarm related to the consumable.

2. The monitoring device according to claim 1, wherein the acquiring unit includes a stationary polling execution section that executes stationary polling to periodically acquire the status information from the printer, and a scrutiny polling execution section that executes, for the printer, scrutiny polling to periodically acquire the status information from the printer at shorter intervals than those at which the stationary polling periodically acquires the status information, the second determination unit determines as to whether the first state transition is the apparent first state transition or the actual first state transition, by referencing at least status information acquired by the scrutiny polling, and the scrutiny polling execution section executes the scrutiny polling when the first determination unit determines the first state transition based on the status information acquired by the stationary polling execution section.

3. The monitoring device according to claim 2, wherein the second determination unit further includes a computation section that computes a numeric value indicating an actual operation amount of the printer based on a change in the status information before and after the first state transition, and the second determination unit determines as to whether the first state transition is the apparent first state transition or the actual first state transition, based on the status information acquired by the scrutiny polling and the numeric value indicating the actual operation amount computed by the computation section.

4. The monitoring device according to claim 3, further comprising:

a specification acceptance unit that accepts specification of an alarm sensitivity; and a switch unit that switches an execution condition of the scrutiny polling executed by the scrutiny polling section and a determination condition about the numeric value indicating the actual operation amount for the second determination unit to determine as to whether the first state transition is the apparent first state transition or the actual first state transition, in association with each other in accordance with the alarm sensitivity specified in the specification acceptance unit.

5. The monitoring device according to claim 4, wherein the second determination unit executes a first basic determination of determining as to whether the first state transition is the apparent first state transition or the actual first state transition, based on the status information acquired by the scrutiny polling, a second basic determination of determining as to whether the first state transition is the apparent first state transition or the actual first state transition, based on the numeric value indicating the actual operation amount computed by the computation section, and a comprehensive determination of determining as to whether the first state transition is the apparent first state transition or the actual first state transition, based on results of the first basic determination and the second basic determination, and the switch unit switches a condition to be satisfied by a combination of the determination results of the first basic determination and the second basic determination to determine the first state transition in the comprehensive determination, in association with an execution condition of the scrutiny polling by the scrutiny polling section and a determination condition about the numeric value indicating the actual operation amount in accordance with the alarm sensitivity specified in the specification acceptance unit.

6. The monitoring device according to claim 4, wherein as the alarm sensitivity becomes lower, the switch unit executes at least one of (i) increasing the number of execution times of the scrutiny polling and (ii) enlarging an execution interval of the scrutiny polling as the switching of the execution condition of the scrutiny polling, and the switch unit enlarges a threshold value for the numeric value indicating the actual operation amount to determine the actual first state transition, as the switching of the determination condition relating to the numeric value indicating the actual operation amount.

7. The monitoring device according to claim 2, wherein the scrutiny polling execution section executes the scrutiny polling before a next stationary polling is executed after the first determination unit determines the first state transition.

8. The monitoring device according to claim 2, further comprising:

a specification acceptance unit that accepts specification of an alarm sensitivity; and a switch unit, wherein as the alarm sensitivity specified in the specification acceptance unit becomes lower, the switch unit switches an execution condition of the scrutiny polling by the scrutiny polling execution section so as to increase the number of execution times of the scrutiny polling or enlarge an execution interval of the scrutiny polling.

9. The monitoring device according to claim 1, wherein the second determination unit includes a computation section that computes a numeric value indicating an actual operation amount of the printer based on a change in the status information before and after the first state transition, and a determination section that determines as to whether the first state transition is the apparent first state transition or the actual first state transition, based on at least the numeric value indicating the actual operation amount.

10. The monitoring device according to claim 9, further comprising:

a specification acceptance unit that accepts specification of an alarm sensitivity; and a switch unit that switches a determination condition about the numeric value indicating the actual operation amount for the determination section to determine as to whether the first state transition is the apparent first state transition or the actual first state transition, in accordance with the alarm sensitivity specified in the specification acceptance unit.

11. The monitoring device according to claim 10, wherein as the alarm sensitivity becomes lower, the switch unit enlarges a threshold value for the numeric value indicating the actual operation amount to determine the actual first state transition as the switching of the determination condition about the numeric value indicating the actual operation amount.

12. The monitoring device according to claim 9, wherein the actual operation amount is a change in the total number of print sheets before and after the first state transition.

13. The monitoring device according to claim 9, wherein the actual operation amount is a change in remaining amounts of the consumable before and after the first state transition.

14. The monitoring device according to claim 1, wherein the acquiring unit includes a stationary polling execution section that executes stationary polling to periodically acquire the status information from the printer, and a scrutiny polling execution section that executes, for the printer, scrutiny polling for a shorter period than that for which the stationary polling is executed, the second determination unit determines as to whether the first state transition is the apparent first state transition or the actual first state transition, by referencing at least status information acquired by the scrutiny polling; and the scrutiny polling execution section executes the scrutiny polling before a next stationary polling is executed after the first determination unit determines the first state transition.

15. A monitoring method comprising:

periodically acquiring status information from a printer having a consumable;

determining, by a processor, a first state transition from an occurrence state of a consumable alarm to a release state of the consumable alarm, the release state being a state in which the consumable alarm is cleared, and a second state transition from the release state of the consumable alarm to the occurrence state of the consumable alarm based on the status information periodically acquired;

if the first state transition is determined, determining, based on the status information periodically acquired, as to whether the determined first state transition is an apparent first state transition or an actual first state transition;

if the actual first state transition is determined and then the second state transition is determined, notifying an alarm relating to the consumable to an administrator; and if the apparent first state transition is determined and then the second state transition is determined, suppressing the alarm related to the consumable.

16. A non-transitory computer readable recording medium storing a program that causes a computer to execute a monitoring process, the monitoring process comprising:

periodically acquiring status information from a printer having a consumable;

determining a first state transition from an occurrence state of a consumable alarm to a release state of the consumable alarm, the release state being a state in which the consumable alarm is cleared, and a second state transition from the release state of the consumable alarm to the occurrence state of the consumable alarm based on the status information periodically acquired;

if the first state transition is determined, determining, based on the status information periodically acquired, as to whether the determined first state transition is an apparent first state transition or an actual first state transition;

if the actual first state transition is determined and then the second state transition is determined, notifying an alarm relating to the consumable to an administrator; and if the apparent first state transition is determined and then the second state transition is determined, suppressing the alarm related to the consumable.

17. A monitoring device comprising:

an acquiring unit that periodically acquires status information from a printer having a consumable;

a first determination unit that determines a first state transition from an occurrence state of a consumable alarm to a release state of the consumable alarm and a second state transition from the release state of the consumable alarm to the occurrence state of the consumable alarm based on the status information periodically acquired by the acquiring unit;

a second determination unit, wherein if the first state transition is determined, the second determination unit determines, based on the status information periodically acquired by the acquiring unit, as to whether the determined first state transition is an apparent first state transition or an actual first state transition; and a notification unit, wherein if the actual first state transition is determined and then the second state transition is determined, the notification unit notifies an alarm relating to the consumable to an administrator, wherein the acquiring unit includes a stationary polling execution section that executes stationary polling to periodically acquire the status information from the printer, and a scrutiny polling execution section that executes, for the printer, scrutiny polling for a shorter period than that for which the stationary polling is executed, the second determination unit determines as to whether the first state transition is the apparent first state transition or the actual first state transition, by referencing at least status information acquired by the scrutiny polling, and wherein the scrutiny polling execution section executes the scrutiny polling before a next stationary polling is executed after the first determination unit determines the first state transition.

* * * * *